United States Patent
Ni et al.

(10) Patent No.: US 10,897,700 B2
(45) Date of Patent: Jan. 19, 2021

(54) SERVICE PROCESSING METHOD AND SYSTEM

(71) Applicant: SPREADTRUM COMMUNICATIONS (SHANGHAI) CO., LTD., Shanghai (CN)

(72) Inventors: Jinjin Ni, Shanghai (CN); Yong Wang, Shanghai (CN); Xianliang Chen, Shanghai (CN); Xichun Gao, Shanghai (CN); Yi He, Shanghai (CN); Xia Wei, Shanghai (CN); Feng Shi, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 15/800,594

(22) Filed: Nov. 1, 2017

(65) Prior Publication Data
US 2018/0213392 A1    Jul. 26, 2018

(30) Foreign Application Priority Data
Jan. 24, 2017 (CN) .......................... 2017 1 0062559

(51) Int. Cl.
*H04W 8/18* (2009.01)
*H04W 60/00* (2009.01)
(Continued)

(52) U.S. Cl.
CPC .......... *H04W 8/183* (2013.01); *H04W 60/00* (2013.01); *H04W 68/02* (2013.01); *H04W 76/10* (2018.02); *H04W 60/04* (2013.01); *H04W 88/06* (2013.01)

(58) Field of Classification Search
CPC ..... H04W 8/183; H04W 76/10; H04W 60/00; H04W 88/06
See application file for complete search history.

(56) References Cited

U.S. PATENT DOCUMENTS

| 9,167,592 B1* | 10/2015 | Hsu ......................... H04L 47/30 |
| 2011/0077003 A1 | 3/2011 | Shin |

(Continued)

FOREIGN PATENT DOCUMENTS

| CN | 102036350 A | 4/2011 |
| CN | 103167481 A | 6/2013 |

OTHER PUBLICATIONS

Google Scholar Search Results.*
CNIPA First Office Action for corresponding CN Application No. 201710062559.0, dated Sep. 3, 2020.

*Primary Examiner* — Qun Shen
(74) *Attorney, Agent, or Firm* — Cantor Colburn LLP

(57) ABSTRACT

Service processing method and system are provided. The method includes: if it is detected that a first subscriber identity card in a multi-card mobile terminal is performing call service, controlling other subscriber identity card in the multi-card mobile terminal to register with a service network based on a data channel set up by the first subscriber identity card; and during the call service of the first subscriber identity card, if a call service request is received from other subscriber identity card in the multi-card mobile terminal, providing call service to the other subscriber identity card which transmits the call service request based on a data transmission channel set up by the first subscriber identity card. By the method, multi-pass is realized for a multi-card single-pass mobile terminal based on hardware.

16 Claims, 3 Drawing Sheets if it is detected that a first subscriber identity card in a multi-card mobile terminal is performing call service, other subscriber identity card in the multi-card mobile terminal is controlled to register with a service network based on a data channel set up by the first subscriber identity card — 11 during the call service of the first subscriber identity card, if a call service request is received from other subscriber identity card in the multi-card mobile terminal, providing call service to the other subscriber identity card which transmits the call service request based on a data transmission channel set up by the first subscriber identity card — 12

(51) Int. Cl.
    *H04W 76/10*     (2018.01)
    *H04W 68/02*     (2009.01)
    *H04W 88/06*     (2009.01)
    *H04W 60/04*     (2009.01)

(56) References Cited

U.S. PATENT DOCUMENTS

| | | | |
|---|---|---|---|
| 2011/0261817 A1* | 10/2011 | Morris | H04L 45/00 370/392 |
| 2012/0178500 A1* | 7/2012 | Hwang | H04W 8/183 455/558 |
| 2013/0150036 A1 | 6/2013 | Pattaswamy et al. | |
| 2014/0274047 A1* | 9/2014 | Dhanda | H04W 40/02 455/435.1 |
| 2014/0364118 A1* | 12/2014 | Belghoul | H04L 65/1069 455/435.1 |
| 2015/0296520 A1* | 10/2015 | Batchu | H04W 72/02 455/434 |
| 2016/0105864 A1* | 4/2016 | Guo | H04W 74/004 455/435.1 |

\* cited by examiner

SERVICE PROCESSING METHOD AND SYSTEM

CROSS-REFERENCE TO RELATED APPLICATIONS

This application claims the benefit of priority under 35 U.S.C. § 119 to Chinese patent application No. 201710062559.0, filed on Jan. 24, 2017, and the entire disclosure of which is incorporated herein by reference.

TECHNICAL FIELD

The present disclosure generally relates to communication technology field, and more particularly, to service processing method and system.

BACKGROUND

With the successive commercial use of various mobile networks, covering multiple network signals in a same area has become a common phenomenon, which leads to fierce competition of operators which operate different mobile networks, and brings to users more choices.

To facilitate users' choosing a mobile network flexibly according to their own needs, most mobile terminals have multi-card function.

At present, most multi-card mobile terminals are usually multi-card single-pass mobile terminal. That is, at a time point, call service can be provided for only one subscriber identity card, while other subscriber identity cards cannot communicate with a network at the time point, which is difficult to meet users' service demand of calling based on multiple subscriber identity cards at the same time.

SUMMARY

In embodiments of the present disclosure, multi-pass is realized for a multi-card single-pass mobile terminal based on hardware.

In an embodiment of the present disclosure, a service processing method is provided, including: if it is detected that a first subscriber identity card in a multi-card mobile terminal is performing call service, controlling other subscriber identity card in the multi-card mobile terminal to register with a service network based on a data channel set up by the first subscriber identity card, wherein the first subscriber identity card is any one of subscriber identity cards in the multi-card mobile terminal; and during the call service of the first subscriber identity card, if a call service request is received from other subscriber identity card in the multi-card mobile terminal, providing call service to the other subscriber identity card which transmits the call service request based on a data transmission channel set up by the first subscriber identity card, wherein the data transmission channel comprises the data channel and a wireless connection.

Optionally, the method may further include: when all the subscriber identity cards in the multi-card mobile terminal are in an idle state, controlling the subscriber identity cards to register with the service network based on corresponding data channels respectively, wherein for each subscriber identity card, the data channel corresponds to a wireless connection.

Optionally, controlling other subscriber identity card in the multi-card mobile terminal to register with a service network based on a data channel set up by the first subscriber identity card may include: simultaneously or sequentially controlling the other subscriber identity card in the multi-card mobile terminal to register with the service network based on the data channel set up by the first subscriber identity card.

Optionally, call service performed by the subscriber identity card in the multi-card mobile terminal may be VoLTE service or VoWiFi service.

Optionally, the data channel may include a default bearer or a dedicated bearer for IP Multimedia Subsystem (IMS) Public Data Network (PDN), or a service bearer of a future evolution network.

Optionally, the service network may be an IMS network.

In an embodiment of the present disclosure, a service processing system is provided, including: a first controlling circuitry configured to: if it is detected that a first subscriber identity card in a multi-card mobile terminal is performing call service, control other subscriber identity card in the multi-card mobile terminal to register with a service network based on a data channel set up by the first subscriber identity card, wherein the first subscriber identity card is any one of subscriber identity cards in the multi-card mobile terminal; and a service processing circuitry configured to: during the call service of the first subscriber identity card, if a call service request is received from other subscriber identity card in the multi-card mobile terminal, provide call service to the other subscriber identity card which transmits the call service request based on a data transmission channel set up by the first subscriber identity card, wherein the data transmission channel comprises the data channel and a wireless connection.

Optionally, the system may further include: a second controlling circuitry configured to: when all the subscriber identity cards in the multi-card mobile terminal are in an idle state, controlling the subscriber identity cards to register with the service network based on corresponding data channels respectively, wherein for each subscriber identity card, the data channel corresponds to a wireless connection.

Optionally, the first controlling circuitry may be configured to simultaneously or sequentially control the other subscriber identity card in the multi-card mobile terminal to register with the service network based on the data channel set up by the first subscriber identity card.

Optionally, call service performed by the subscriber identity card in the multi-card mobile terminal may be VoLTE service or VoWiFi service.

Optionally, the data channel may include a default bearer or a dedicated bearer for IMS PDN, or a service bearer of a future evolution network.

Optionally, the service network may be an IMS network.

Embodiments of the present disclosure may provide following advantages. During the call service of the first subscriber identity card in the multi-card mobile terminal, other subscriber identity card in the multi-card mobile terminal is controlled to register with the service network based on the data channel set up by the first subscriber identity card. Further, during the call service of the first subscriber identity card, if a call service request is received from other subscriber identity card in the multi-card mobile terminal, call service may be provided to the other subscriber identity card which transmits the call service request based on the data transmission channel set up by the first subscriber identity card. Therefore, service demand of calling based on multiple subscriber identity cards at the same time can be met. By the method, call service can be provided to multiple subscriber identity cards using the data transmission channel set up by a unique radio frequency processing module in the multi-card single-pass mobile terminal. Therefore, multi-card multi-pass service is realized based on a hardware basis of a multi-card single-pass mobile terminal.

DETAILED DESCRIPTION

The existing multi-card single-pass mobile terminal includes only one radio frequency processing module. Therefore, at a time point, call service can be provided for only one subscriber identity card, which is difficult to meet users' service demand of calling based on multiple subscriber identity cards at the same time.

Embodiments of the present disclosure provide a service processing method. During the call service of the first subscriber identity card in the multi-card mobile terminal, other subscriber identity card in the multi-card mobile terminal is controlled to register with the service network based on the data channel set up by the first subscriber identity card. Further, during the call service of the first subscriber identity card, if a call service request is received from other subscriber identity card in the multi-card mobile terminal, call service may be provided to the other subscriber identity card which transmits the call service request based on the data transmission channel set up by the first subscriber identity card. Therefore, multi-card multi-pass service is realized based on a hardware basis of a multi-card single-pass mobile terminal.

In order to clarify the object, solutions and advantages of embodiments of the present disclosure, embodiments of present disclosure will be described clearly in detail in conjunction with accompanying drawings.

Figure 1:
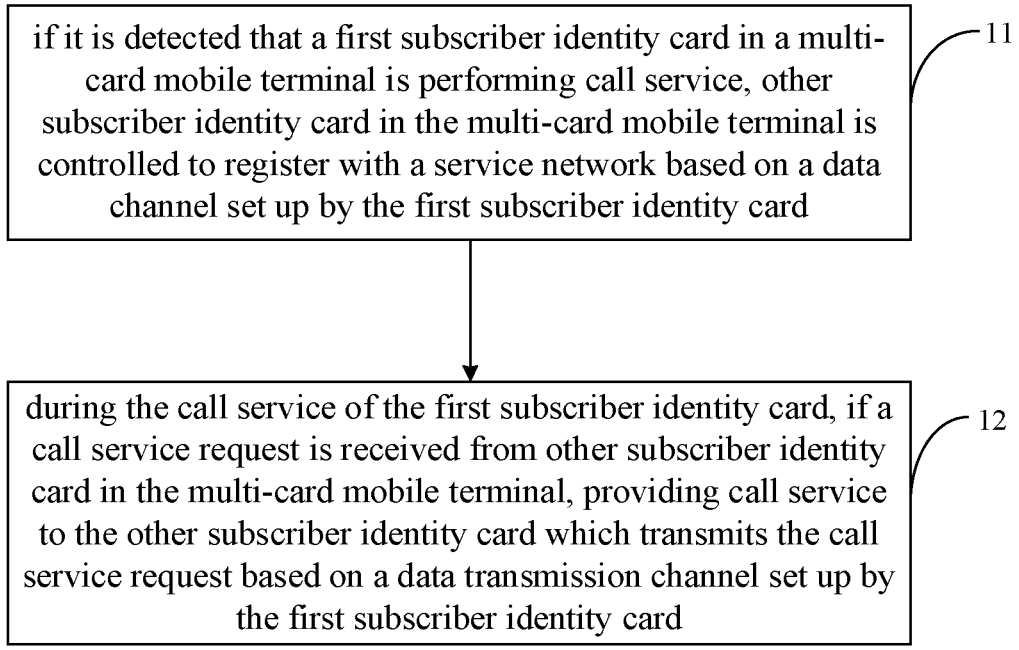
FIG. 1 schematically illustrates a flow chart of a service processing method according to an embodiment.

FIG. 1 schematically illustrates a flow chart of a multi-party call method for a multi-channel terminal according to an embodiment. The method may include steps 11 and 12.

In step 11, if it is detected that a first subscriber identity card in a multi-card mobile terminal is performing call service, other subscriber identity card in the multi-card mobile terminal is controlled to register with a service network based on a data channel set up by the first subscriber identity card.

In some embodiments, the multi-card mobile terminal may determine whether there is a subscriber identity card in call based on status information of each subscriber identity card. Here, a subscriber identity card which is performing call service in the multi-card mobile terminal serves as the first subscriber identity card. The first subscriber identity card may be any one of subscriber identity cards in the multi-card mobile terminal. In the call service the first subscriber identity card is performing, the first subscriber identity card may be a called party or a calling party.

In some embodiments, the other subscriber identity card in the multi-card mobile terminal may be controlled to register with the service network based on the data channel set up by the first subscriber identity card when the first subscriber identity card initiates the call service. In some embodiments, the other subscriber identity card in the multi-card mobile terminal may be controlled to register with the service network based on the data channel set up by the first subscriber identity card after the call service is set up by the first subscriber identity card.

If there are more than one other subscriber identity cards, the sequence for controlling the other subscriber identity cards in the multi-card mobile terminal to register with the service network based on the data channel set up by the first subscriber identity card is not limited. That is, the other subscriber identity cards in the multi-card mobile terminal may be controlled to register with the service network based on the data channel set up by the first subscriber identity card simultaneously or sequentially, as long as the subscriber identity card which transmits a call service request can succeed in registering with the service network.

In some embodiments, a data transmission channel may include a data channel and a wireless connection. The data channel is a connection for data transmission between the subscriber identity card and the service network, and the wireless connection is a connection between the mobile terminal and a wireless network which is set up based on the subscriber identity card.

The wireless network may be a wireless network implemented through a public mobile communication network, such as 5G, 4G, 3G or General Packet Radio Service (GPRS) network, or may be a wireless local area network (such as WiFi). Those skilled in the art can understand that any network using a radio electromagnetic wave as a transmission medium can be used as the wireless network in embodiments of the present disclosure.

The call service based on a 4G Long Term Evolution (LTE) network is VoLTE network, while the call service based on a WiFi network is VoWiFi network. The call service performed by the subscriber identity card in the multi-card mobile terminal may be VoLTE service or VoWiFi service.

In some embodiments, the data channel may include a default bearer or a dedicated bearer for IMS PDN, or a service bearer of a future evolution network.

In some embodiments, when detecting that the first subscriber identity card in the multi-card mobile terminal is performing call service, the multi-card mobile terminal may control other subscriber identity card in the multi-card mobile terminal to register with a service network based on a data channel set up by the first subscriber identity card. For example, the multi-card mobile terminal may control each of the other subscriber identity cards to transmit a registration request to the service network respectively and perform signaling interaction with the service network to realize registration with the service network.

In step 12, during the call service of the first subscriber identity card, if a call service request is received from other subscriber identity card in the multi-card mobile terminal, providing call service to the other subscriber identity card which transmits the call service request based on a data transmission channel set up by the first subscriber identity card.

During the call service of the first subscriber identity card in the multi-card mobile terminal, other subscriber identity card in the multi-card mobile terminal has been controlled to register with the service network based on the data channel set up by the first subscriber identity card. Therefore, during the call service of the first subscriber identity card, if a call service request is received from other subscriber identity card in the multi-card mobile terminal, call service can be provided to the other subscriber identity card which transmits the call service request based on the data transmission channel set up by the first subscriber identity card. In this way, multi-card multi-pass service is realized.

Figure 2:
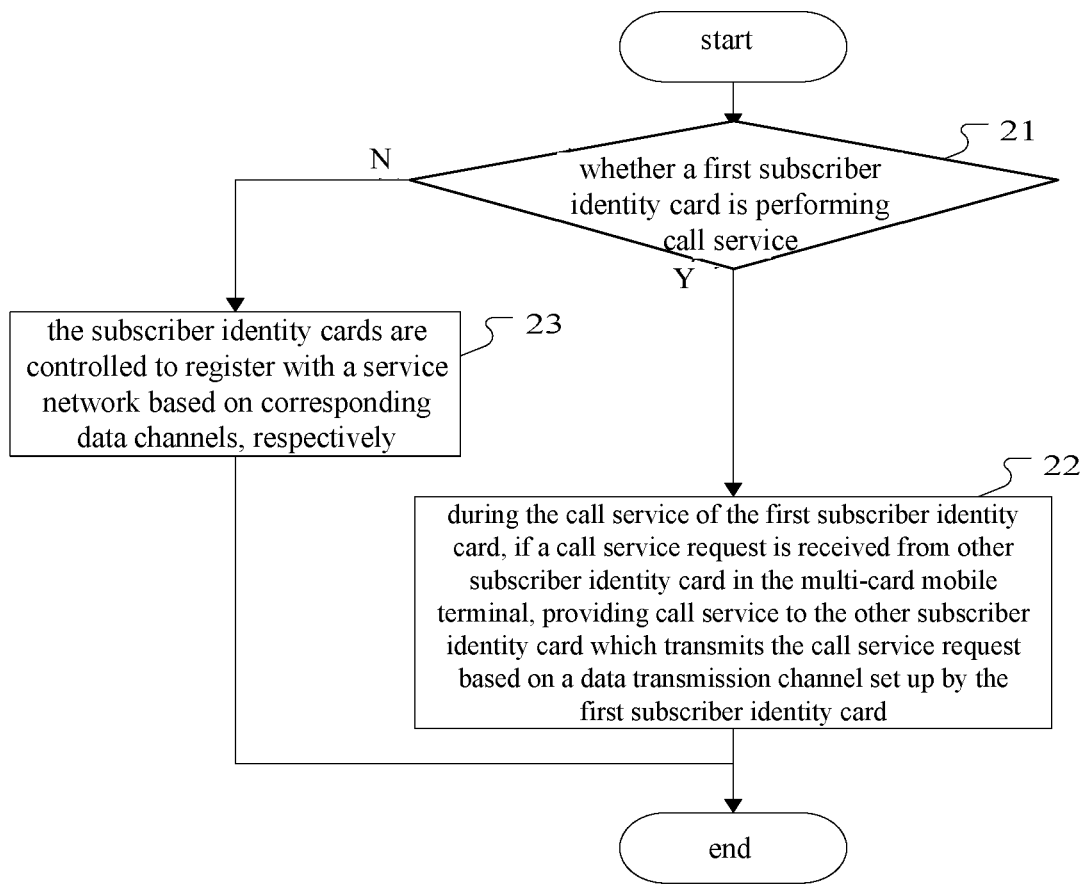
FIG. 2 schematically illustrates a flow chart of a service processing method according to an embodiment.

FIG. 2 schematically illustrates a flow chart of a service processing method according to another embodiment.

In step 21, whether a first subscriber identity card in a multi-card mobile terminal is performing call service is detected.

In some embodiments, the first subscriber identity card is any one of subscriber identity cards in the multi-card mobile terminal.

If it is detected that the first subscriber identity card is performing call service, step 22 is performed; or else, step 23 is performed.

In step 22, during the call service of the first subscriber identity card, if a call service request is received from other subscriber identity card in the multi-card mobile terminal, providing call service to the other subscriber identity card which transmits the call service request based on a data transmission channel set up by the first subscriber identity card.

In some embodiments, the data transmission channel may include the data channel and a wireless connection.

Details of steps 21 and 22 may be referred to the above descriptions of steps 11 and 12, and are not described in detail here.

In step 23, the subscriber identity cards are controlled to register with a service network based on corresponding data channels, respectively.

When all the subscriber identity cards in the multi-card mobile terminal are not performing call service, i.e., in an idle state, the subscriber identity cards are controlled to register with the service network based on corresponding data channels respectively, wherein for each subscriber identity card, the data channel corresponds to a wireless connection. That is, the subscriber identity cards correspond to different data transmission channels, respectively, in an idle state.

Figure 3:
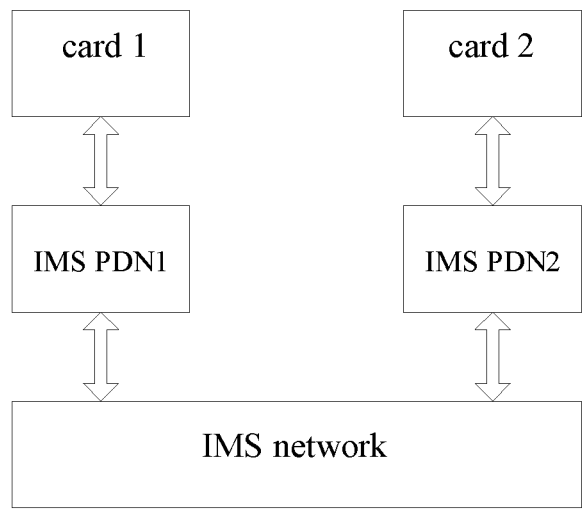
FIG. 3 schematically illustrates a diagram of a service processing procedure according to an embodiment.
Figure 4:
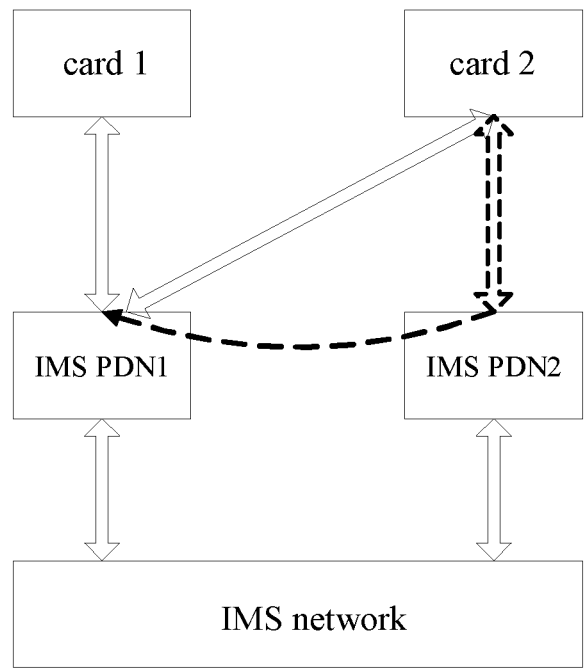
FIG. 4 schematically illustrates a diagram of a service processing procedure according to an embodiment.

Referring to FIGS. 3 and 4, take a dual-card mobile terminal for example. The dual-card mobile terminal includes two subscriber identity cards, card 1 and card 2 whose call service is VoLTE service.

Referring to FIG. 3, in the idle state, cards 1 and 2 are attached to an LTE network respectively, and set up data channels IMS PDN1 and IMS PDN2 with an IMS network respectively, where the data channel between the card 1 and the IMS network is IMS PDN1, and the data channel between the card 2 and the IMS network is IMS PDN2. Card 1 registers with the IMS network based on the data channel IMS PDN1 and card 2 registers with the IMS network based on the data channel IMS PDN2.

Referring to FIG. 4, when card 1 performs call service, card 2 may registers with the IMS network based on the data channel IMS PDN1 set up by card 1. In this way, during the call service of card 1, card 2 may perform call service based on the data channel IMS PDN1 set up by card 1, to realize multi-card multi-pass.

When the call service of card 1 ends, if card 2 is not performing call service, card 2 may register with the IMS network based on the data channel IMS PDN2.

When the call service of card 2 ends, if card 1 is not performing call service, card 2 may register with the IMS network based on the data channel IMS PDN2.

It should be noted that, the service processing method in the above embodiments is described by taking a dual-card mobile terminal as an example. The method is also adapted to a multi-card mobile terminal with three cards or more than three cards, which is not described in detail here.

From above, by the service processing method for the multi-card mobile terminal, during the call service of the first subscriber identity card in the multi-card mobile terminal, other subscriber identity card in the multi-card mobile terminal is controlled to register with the service network based on the data channel set up by the first subscriber identity card, so that call service can be provided to multiple subscriber identity cards at the same time based on a hardware basis of an existing multi-card single-pass mobile terminal.

For those skilled in the art to better understand and implement embodiments of the present disclosure, a service processing system corresponding to the above service processing method is described in detail below.

Figure 5:
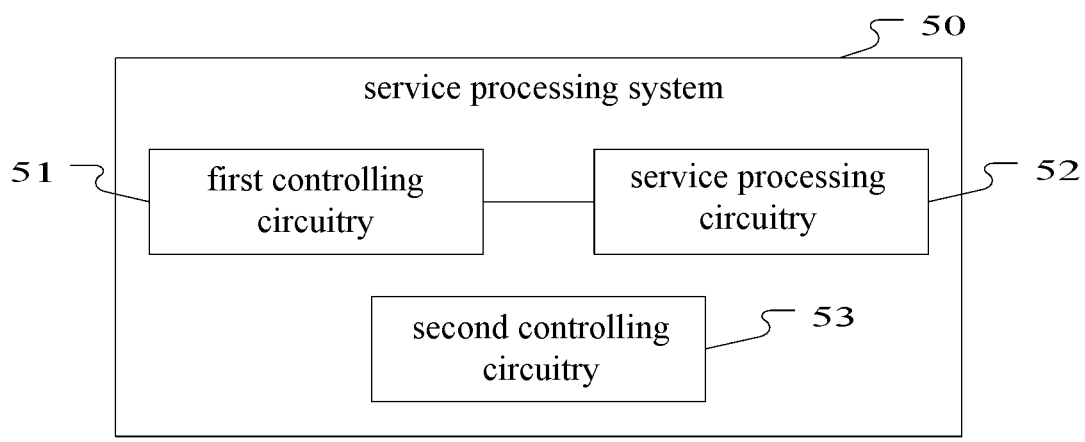
FIG. 5 schematically illustrates a structural diagram of a service processing system according to an embodiment.

Referring to FIG. 5, in an embodiment of the present disclosure, a service processing system 50 is provided, including: a first controlling circuitry 51 configured to: if it is detected that a first subscriber identity card in a multi-card mobile terminal is performing call service, control other subscriber identity card in the multi-card mobile terminal to register with a service network based on a data channel set up by the first subscriber identity card, wherein the first subscriber identity card is any one of subscriber identity cards in the multi-card mobile terminal; and a service processing circuitry 52 configured to: during the call service of the first subscriber identity card, if a call service request is received from other subscriber identity card in the multi-card mobile terminal, provide call service to the other subscriber identity card which transmits the call service request based on a data transmission channel set up by the first subscriber identity card, wherein the data transmission channel comprises the data channel and a wireless connection.

In some embodiments, the first controlling circuitry 51 may be configured to simultaneously or sequentially control the other subscriber identity card in the multi-card mobile terminal to register with the service network based on the data channel set up by the first subscriber identity card.

In some embodiments, call service performed by the subscriber identity card in the multi-card mobile terminal may be VoLTE service or VoWiFi service.

In some embodiments, the data channel may include a default bearer or a dedicated bearer for IMS PDN, or a service bearer of a future evolution network.

In some embodiments, the system 50 may further include: a second controlling circuitry 53 configured to: when all the subscriber identity cards in the multi-card mobile terminal are in an idle state, controlling the subscriber identity cards to register with the service network based on corresponding data channels respectively, wherein for each subscriber identity card, the data channel corresponds to a wireless connection.

In embodiments of the present disclosure, the multi-card mobile terminal may be any computer device used in motion which includes but not limited to mobile phone, notebook computer, tablet computer and on-vehicle computer. Besides, the number of the subscriber identity cards is not limited. The multi-card mobile terminal may support both physical subscriber identity cards non-physical subscriber identity cards. For example, the multi-card mobile terminal may include one virtual subscriber identity card and one physical subscriber identity card, or include one virtual subscriber identity card and more than one physical subscriber identity cards, or include more than one virtual subscriber identity cards and more than one physical subscriber identity cards.

In embodiments of the present disclosure, the subscriber identity card may be of any specification and standard which is not limited here, as long as the subscriber identity card can be identified based on its information. The specification and standard the subscriber identity card belongs to does not limit and falls into the scope of the present disclosure. For example, regarding a supported network mode, the subscriber identity card may be a common SIM card, a USIM card or an eSIM card. Regarding the size, the subscriber identity card may be a standard SIM card with a size of 25 mm×15 mm, or a small SIM card with a size of 12 mm×15 mm.

Those skilled in the art can understand that all of or a portion of the processes in the method provided in the above embodiments can be implemented by related hardware with instruction of computer program. The computer program may be stored in a readable storage medium, such as a magnetic disk, an optical disk, a Read-Only Memory (ROM) or a Random Access Memory (RAM).

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

What is claimed is:

1. A service processing method, comprising:
   in response to a detection that a first subscriber identity card in a multi-card mobile terminal is performing call service, controlling other subscriber identity card in the multi-card mobile terminal to register with a service network based on a data channel which is set up by the first subscriber identity card and used by the first subscriber identity card to perform the call service, wherein the first subscriber identity card is any one of subscriber identity cards in the multi-card mobile terminal; and during the call service of the first subscriber identity card,
   in response to a call service request is received from the other subscriber identity card in the multi-card mobile terminal, providing call service to the other subscriber identity card which transmits the call service request using a data transmission channel set up by the first subscriber identity card, wherein the data transmission channel comprises the data channel set up by the first subscriber identity card and a wireless connection.

2. The method according to claim 1, further comprising: when all the subscriber identity cards in the multi-card mobile terminal are in an idle state, controlling the subscriber identity cards to register with the service network based on corresponding data channels respectively, wherein for each subscriber identity card, the data channel corresponds to a wireless connection.

3. The method according to claim 1, wherein call service performed by the subscriber identity cards in the multi-card mobile terminal is Voice over Long-Term Evolution (VoLTE) service or Voice over Wireless Fidelity (VoWiFi) service.

4. The method according to claim 2, wherein call service performed by the subscriber identity cards in the multi-card mobile terminal is VoLTE service or VoWiFi service.

5. The method according to claim 1, wherein the data channel comprises a default bearer or a dedicated bearer for IP Multimedia Subsystem (IMS) Public Data Network (PDN).

6. The method according to claim 2, wherein the data channel comprises a default bearer or a dedicated bearer for IMS PDN.

7. The method according to claim 1, wherein the service network is an IMS network.

8. The method according to claim 2, wherein the service network is an IMS network.

9. A service processing system, comprising:
   a first controlling circuitry configured to: in response to a detection that a first subscriber identity card in a multi-card mobile terminal is performing call service, control other subscriber identity card in the multi-card mobile terminal to register with a service network based on a data channel which is set up by the first subscriber identity card and used by the first subscriber identity card to perform the call service, wherein the first subscriber identity card is any one of subscriber identity cards in the multi-card mobile terminal; and
   a service processing circuitry configured to: during the call service of the first subscriber identity card, in response to a call service request is received from the other subscriber identity card in the multi-card mobile terminal, provide call service to the other subscriber identity card which transmits the call service request using a data transmission channel set up by the first subscriber identity card, wherein the data transmission channel comprises the data channel set up by the first subscriber identity card and a wireless connection.

10. The system according to claim 9, further comprising:
    a second controlling circuitry configured to: when all the subscriber identity cards in the multi-card mobile terminal are in an idle state, controlling the subscriber identity cards to register with the service network based on corresponding data channels respectively, wherein for each subscriber identity card, the data channel corresponds to a wireless connection.

11. The system according to claim 9, wherein call service performed by the subscriber identity cards in the multi-card mobile terminal is Voice over Long-Term Evolution (VoLTE) service or Voice over Wireless Fidelity (VoWiFi) service.

12. The system according to claim 10, wherein call service performed by the subscriber identity cards in the multi-card mobile terminal is VoLTE service or VoWiFi service.

13. The system according to claim 9, wherein the data channel comprises a default bearer or a dedicated bearer for IP Multimedia Subsystem (IMS) Public Data Network (PDN).

14. The system according to claim 10, wherein the data channel comprises a default bearer or a dedicated bearer for IMS PDN.

15. The system according to claim 9, wherein the service network is an IMS network.

16. The system according to claim 10, wherein the service network is an IMS network.

* * * * *